(12) United States Patent
Horowitz et al.

(10) Patent No.: US 11,400,976 B2
(45) Date of Patent: Aug. 2, 2022

(54) STEERING WHEEL ANGLE CALIBRATION (71) Applicant: Ford Global Technologies, LLC, Dearborn, MI (US)

(72) Inventors: Geoffrey Horowitz, Farmington Hills, MI (US); Daniel A. Makled, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 194 days.

(21) Appl. No.: 16/935,247

(22) Filed: Jul. 22, 2020

(65) Prior Publication Data

US 2022/0024519 A1 Jan. 27, 2022

(51) Int. Cl.
*B62D 15/02* (2006.01)
*G05D 1/02* (2020.01)

(52) U.S. Cl.
CPC ......... *B62D 15/026* (2013.01); *G05D 1/0214* (2013.01); *G05D 2201/0213* (2013.01)

(58) Field of Classification Search
CPC .. B62D 15/026; B62D 15/025; G05D 1/0214; G05D 2201/0213
See application file for complete search history.

(56) References Cited

U.S. PATENT DOCUMENTS

2019/0193730 A1\* 6/2019 Voorheis ........... B60W 50/0225
2019/0300052 A1 10/2019 Allan et al.

FOREIGN PATENT DOCUMENTS

WO 199617279 A1 6/1996

\* cited by examiner

*Primary Examiner* — Yuen Wong
(74) *Attorney, Agent, or Firm* — Frank A. MacKenzie; Bejin Bieneman PLC (57) ABSTRACT

A first distance $d_1$ between a vehicle at a first location and an object is determined. A best fit line representing the object is determined from a plurality of sensor data. A distance $\Delta d$ to move to a second location is specified. A predicted second distance $d_p$ between the vehicle at the second location and the object is determined based on the first distance $d_1$, the distance $\Delta d$, and the best fit line. The vehicle is operated from the first location to the second location based on a center steering wheel angle. A measured second distance $d_2$ between the vehicle at the second location and object is determined. Then the center steering wheel angle is one of (a) maintained based on the predicted second distance $d_p$ matching the measured second distance $d_2$, or (b) updated based on the predicted second distance $d_p$ being different than the measured second distance $d_2$.

18 Claims, 8 Drawing Sheets

STEERING WHEEL ANGLE CALIBRATION

BACKGROUND

A vehicle may operate autonomously or semi-autonomously, i.e., without input from a human operator to control some or all driving operations, e.g., some or all of steering, propulsion (e.g., throttle), and braking. The vehicle can include sensors to collect data of an environment surrounding the vehicle. A computer in the vehicle can use the data to operate the vehicle. For example, the computer can actuate one or more components such as a steering motor to follow a path autonomously or semi-autonomously.

DETAILED DESCRIPTION

A system includes a computer including a processor and a memory, the memory storing instructions executable by the processor to determine a first distance $d_1$ between a vehicle at a first location and an object. The instructions further include instructions to determine a best fit line representing an object from a plurality of sensor data and specify to move a distance $\Delta d$ to a second location. The instructions further include instructions to determine a predicted second distance $d_p$ between the vehicle at the second location and the object based on the first distance $d_1$, the distance $\Delta d$, and the best fit line. The instructions further include instructions to operate the vehicle from the first location to the second location based on a center steering wheel angle. The instructions further include instructions to determine a measured second distance $d_2$ between the vehicle at the second location and the object. The instructions further include instructions to then one of (a) maintain the center steering wheel angle based on the predicted second distance $d_p$ matching the measured second distance $d_2$, or (b) update the center steering wheel angle based on the predicted second distance $d_p$ being different than the measured second distance $d_2$.

The instructions can further include instructions to determine each of the first distance $d_1$, the measured second distance $d_2$, and the predicted second distance $d_p$ along a line extending parallel to a lateral axis of the vehicle at the first location.

The instructions can further include instructions to determine the predicted second distance $d_p$ additionally based on an angle between the best fit line and one of a longitudinal axis of the vehicle or a lateral axis of the vehicle at the first location.

The instructions can further include instructions to determine each of the measured second distance $d_2$ and the predicted second distance $d_p$ along a line extending parallel to the lateral axis of the vehicle at the first location.

The instructions can further include instructions to operate the vehicle based on (a) the maintained center steering wheel or (b) the updated center steering wheel angle.

The instructions can further include instructions to update the center steering wheel angle in one of (a) a first direction towards the object based on the predicted second distance $d_p$ being less than the measured second distance $d_2$, or (b) a second direction away from the object based on the predicted second distance $d_p$ being greater than the measured second distance $d_2$.

The instructions can further include instructions to, upon determining the predicted second distance $d_p$ is different than the measured second distance $d_2$, determine an angle between a heading of the vehicle at the second location and a heading of the vehicle at the first location. The instructions can further include instructions to update the center steering wheel angle additionally based on the angle.

The instructions can further include instructions to extrapolate the best fit line to intersect at least one of a longitudinal axis of the vehicle at the first location or a lateral axis of the vehicle at the first location.

The instructions can further include instructions to determine the measured second distance $d_2$ based on second sensor data.

The instructions can further include instructions to, upon generating an occupancy grid map based on the plurality of sensor data, determine the best fit line based on the occupancy grid map.

The object may be stationary and on one side of the vehicle

A method includes determining a first distance $d_1$ between a vehicle at a first location and an object. The method further includes determining a best fit line representing an object from a plurality of sensor data and specify to move a distance $\Delta d$ to a second location. The method further includes determining a predicted second distance $d_p$ between the vehicle at the second location and the object based on the first distance $d_1$, the distance $\Delta d$, and the best fit line. The method further includes operating the vehicle from the first location to the second location based on a center steering wheel angle. The method further includes determining a measured second distance $d_2$ between the vehicle at the second location and the object. The method further includes then one of (a) maintaining the center steering wheel angle based on the predicted second distance $d_p$ matching the measured second distance $d_2$, or (b) updating the center steering wheel angle based on the predicted second distance $d_p$ being different than the measured second distance $d_2$.

The method can further include determining each of the first distance $d_1$, the measured second distance $d_2$, and the predicted second distance $d_p$ along a line extending parallel to a lateral axis of the vehicle at the first location.

The method can further include determining the predicted second distance $d_p$ additionally based on an angle between the best fit line and one of a longitudinal axis of the vehicle or a lateral axis of the vehicle.

The method can further include determining each of the measured second distance $d_2$ and the predicted second distance $d_p$ along a line extending parallel to the lateral axis of the vehicle at the first location.

The method can further include operating the vehicle based on (a) the maintained center steering wheel or (b) the updated center steering wheel angle.

The method can further include updating the center steering wheel angle in one of (a) a first direction towards the object based on the predicted second distance $d_p$ being less than the measured second distance $d_2$, or (b) a second direction away from the object based on the predicted second distance $d_p$ being greater than the measured second distance $d_2$.

The method can further include, upon determining the predicted second distance $d_p$ is different than the measured second distance $d_2$, determining an angle between a heading of the vehicle at the second location and a heading of the vehicle at the first location. The method can further include updating the center steering wheel angle additionally based on the angle.

The method can further include determining the measured second distance $d_2$ based on second sensor data.

The method can further include, upon generating an occupancy grid map based on the plurality of sensor data, determining the best fit line based on the occupancy grid map.

Further disclosed herein is a computing device programmed to execute any of the above method steps. Yet further disclosed herein is a computer program product, including a computer readable medium storing instructions executable by a computer processor, to execute an of the above method steps.

A vehicle computer can control a steering angle of front wheels of a vehicle to operate the vehicle along a planned path. A "steering angle" is an angle defined between an axis extending longitudinally through a center of one front wheel of a vehicle and a longitudinal axis of the vehicle. For example, based on the planned path, the vehicle computer can determine the steering angle of the wheels of the vehicle and provide a torque to rotate a steering wheel to a steering wheel angle corresponding to the steering angle of wheels of the vehicle, e.g., based on a steering ratio (i.e., the ratio of an angle change of the steering wheel to an angle change of the front wheels). A "steering wheel angle" is an angle of rotation of the steering wheel relative to a neutral position of the steering wheel. The neutral position defines a steering wheel angle of zero, referred to herein as a center steering angle. It is typically desired for the neutral position of the steering wheel to correspond to a steering angle of zero, i.e., a vehicle proceeding on a straight path and not changing its heading. However, various factors, e.g., friction between vehicle components, tire pressure, a slope of the road, etc., may cause the steering angle of the front wheels to differ from the steering wheel angle such that the vehicle turns relative to the planned path. That is, the vehicle may not operate along a straight path when the steering wheel angle is the center steering wheel angle. Advantageously, the vehicle computer can calibrate the center steering wheel angle based on a detected object, which can assist in operating the vehicle along the planned path.

With reference to the figures, an example vehicle system 100 includes a vehicle 105. A vehicle computer 110 in the vehicle 105 receives data from sensors 115. The vehicle computer 110 is programmed to determine a first distance $d_1$ between the vehicle 105 at a first location and an object 200. The vehicle computer 110 is further programmed to determine, from a plurality of sensor 115 data, a best fit line Bf representing a set of points that partly define a feature of the object 200, e.g., a side, an edge, etc. The vehicle computer 110 is further programmed to specify to move a distance $\Delta d$ to a second location. The vehicle computer 110 is further programmed to determine a predicted second distance $d_p$ between the vehicle 105 at the second location and the object 200 based on the first distance $d_1$, the distance $\Delta d$, and the best fit line Bf. The vehicle computer 110 is further programmed to operate the vehicle 105 from the first location to the second location based on a center steering wheel angle. The vehicle computer 110 is further programmed to determine a measured second distance $d_2$ between the vehicle 105 at the second location and the object 200. The vehicle computer 110 is further programmed then to calibrate the center steering wheel angle by one of (a) maintaining the center steering wheel angle based on the predicted second distance $d_p$ matching the measured second distance $d_2$, or (b) updating the center steering wheel angle based on the predicted second distance $d_p$ being different than the measured second distance $d_2$.

Figure 1:
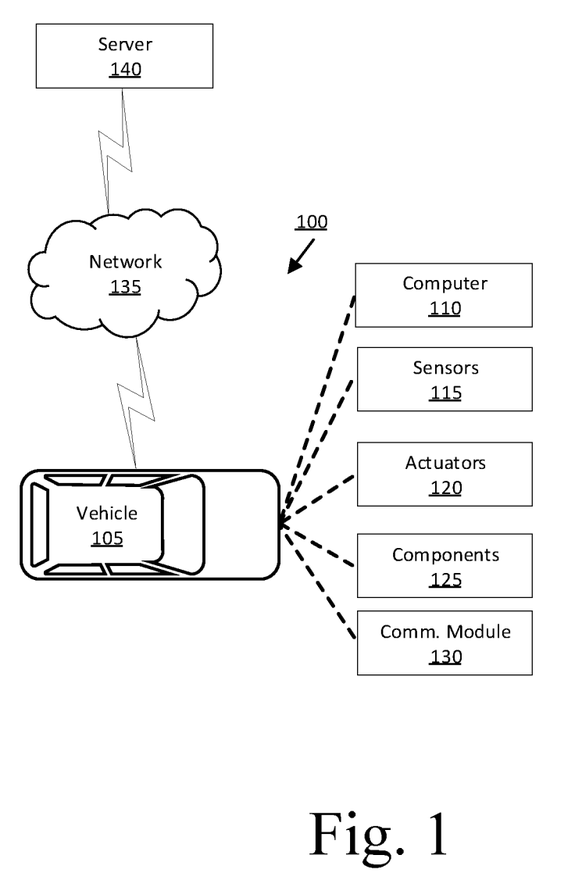
FIG. 1 is a block diagram of an example control system for a vehicle.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a server 140 and/or another vehicle, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, other vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the vehicle 105. Location data specifies a point or points on a ground surface and may be in a conventional form, e.g., geo-coordinates such as latitude and longitude coordinates obtained via a navigation system, as is known, that uses the Global Positioning System (GPS). Additionally, or alternatively, the data can include a location of an object 200, e.g., another vehicle, a sign, a tree, a shrub, etc., relative to the vehicle 105. As one example, the data may be radar data of the environment around the vehicle 105. In such an example, the radar data may include one or more objects 200 around the vehicle 105. The sensors 115 can be mounted to any suitable location in or on the vehicle 105, e.g., on a vehicle 105 bumper, on a vehicle 105 roof, etc., to collect data of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a server 140 (typically via direct radio frequency communications). The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 140 can be a conventional computing device, i.e., including one or more processors and one or more memories, programmed to provide operations such as disclosed herein. Further, the server 140 can be accessed via the network 135, e.g., the Internet or some other wide area network.

Figure 2:
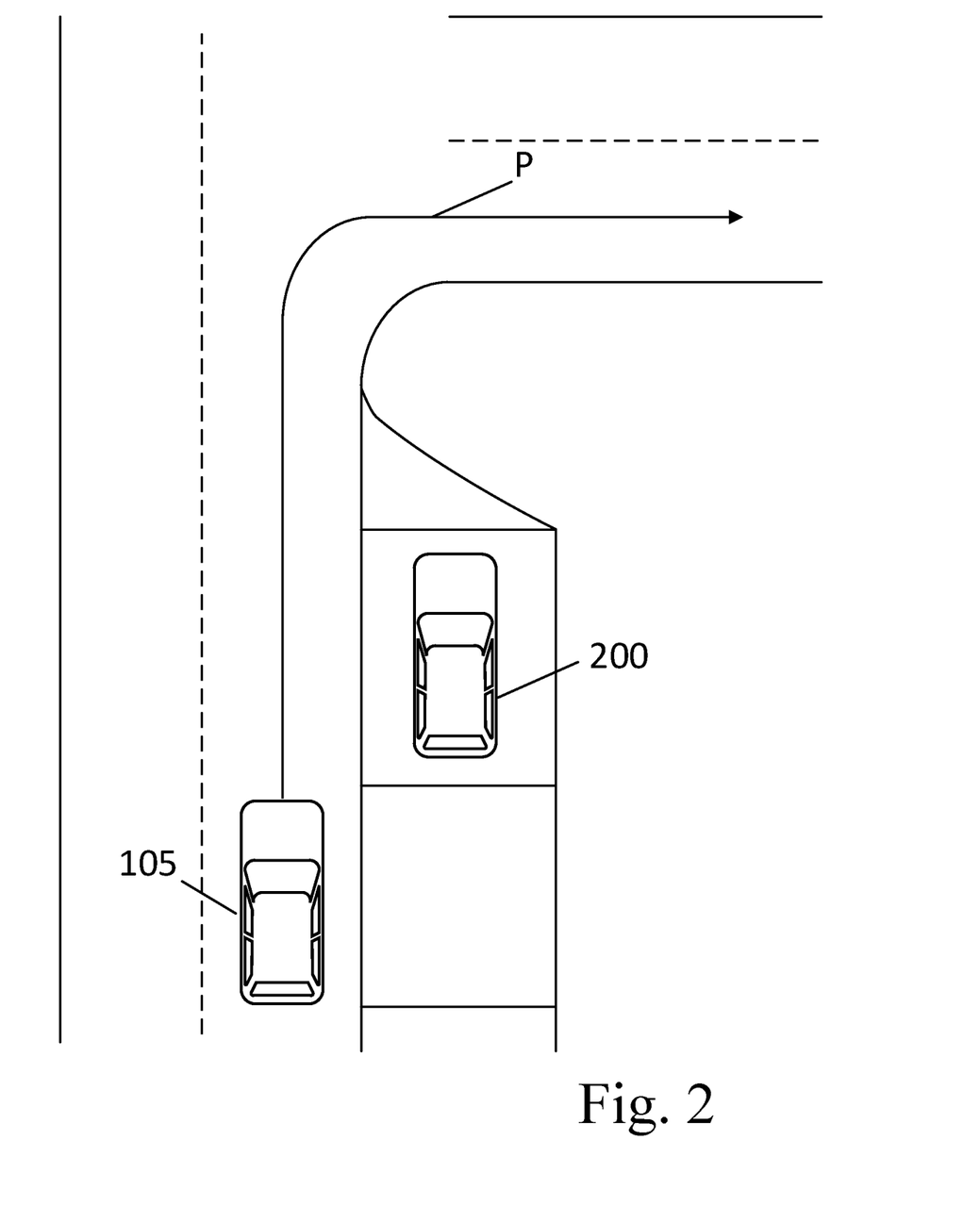
FIG. 2 is a diagram illustrating operating the vehicle according to the system of FIG. 1.

Turning to FIG. 2, the object 200 is a stationary, i.e., non-moving, object. The vehicle computer 110 may determine that the object 200 is stationary based on sensor 115 data, e.g., image data. For example, the vehicle computer 110 can employ conventional image analysis or pattern recognition techniques to analyze the image data and identify a stationary object 200, e.g., a parked vehicle, a bench, a building, a wall, etc. The object 200 may be located on one side, e.g., right or left, of the vehicle 105. By detecting an object 200 on one side of the vehicle 105, the vehicle computer 110 can calibrate the steering wheel angle based on lateral distances between the vehicle 105 and the object 200, as discussed further below.

The vehicle computer 110 can, for example, generate a planned path P to operate the vehicle 105 to a destination. Alternatively, the server 140 can generate the planned path P and provide the path to the vehicle computer 110, e.g., via the network 135. As used herein, a "planned path" is a set of points, e.g., that be specified as coordinates with respect to a vehicle coordinate system and/or geo-coordinates, that the vehicle computer 110 is programmed to determine with a conventional navigation and/or path planning algorithm. A planned path P can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation speed and acceleration including positions in x, y, z, yaw, pitch, roll, yaw rate, pitch rate, roll rate, heading velocity and heading acceleration that can be determined by fitting a polynomial function to successive two-dimensional (2D) locations included in vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x) = a_0 + a_1 x + a_2 x^2 + a_3 x^3 \quad (1)$$

where $a_0$ an offset, i.e., a lateral distance between the path and a center line of the vehicle 101 at the upcoming distance x, $a_1$ is a heading angle of the path, $a_2$ is the curvature of the path, and $a_3$ is the curvature rate of the path.

The vehicle computer 110 can operate the vehicle 105 along a planned path P. For example, the vehicle computer 110 can control at least one of the steering, propulsion, and braking of the vehicle 105 along the planned path P. For example, the vehicle computer 110 can control the steering of the vehicle 105 along the planned path P. That is, the vehicle computer 110 can control the steering component 125 to direct the vehicle 105 along the planned path P. The vehicle computer 110 can, for example, identify a steering angle of the front wheels of the vehicle 105 based on the planned path P, i.e., to keep the vehicle 105 moving along the planned path P, and apply a torque to the steering wheel to rotate the steering wheel to a steering wheel angle corresponding to the identified steering angle of the front wheels, e.g., based on the steering ratio. The steering ratio may be stored, e.g., in the memory of the vehicle computer 110.

The vehicle computer 110 can be programmed to calibrate the center steering wheel angle of the vehicle 105. By calibrating the center steering wheel angle, the vehicle computer 110 can operate the vehicle 105 along the planned path P. The vehicle computer 110 can, for example, initiate calibration of the center steering wheel angle based on the planned path P, e.g., determining a turn in front of the vehicle 105. As another example, the vehicle computer 110 can initiate calibration of the center steering wheel angle based on input from the user, e.g., received via a human-machine interface (HMI), such as a touchscreen display, a button, a knob, etc. As yet another example, the vehicle computer 110 can initiate calibration of the center steering wheel angle based on receiving an instruction from the server 140.

Upon initiating calibration, the vehicle computer 110 determines the first location of the vehicle 105. The vehicle computer 110 may determine the first location, e.g., GPS (Global Positioning System) location coordinates, of the vehicle 105 relative to a coordinate system, e.g., based on data received from GPS sensor 115. Alternatively, the vehicle computer 110 can receive the first location of the vehicle 105 from the server 140, e.g., via the network 135. The vehicle computer 110 may, for example, be programmed to determine a heading of the vehicle 105 at the first location based on a coordinate system of the GPS. The heading of the vehicle 105 is defined with respect to a coordinate system, e.g., by an angle between the longitudinal axis L of the vehicle 105 at the first location and the latitudinal or X axis of the GPS coordinate system.

While the vehicle 105 is at the first location, the vehicle computer 110 can be programmed to detect an object 200 on one side of the vehicle 105 based on sensor 115 data. For example, the sensor 115 can be a radar sensor 115, e.g., a frequency modulated continuous wave (FMCW) radar. In such an example, the vehicle computer 110 can detect the object 200 in radar data. Radar sensors 115 may provide two-dimensional (2D) data. For example, a radar sensor 115 may provide data in a horizontal plane. That is, data output from the radar sensor 115 may lack elevation or height data (i.e., data with respect to the Z axis or data in a vertical dimension). Thus, the vehicle computer 110 may determine 2D object data rather than 3D coordinates. For example, the computer 110 may determine location coordinates (x, y) of the object 200 relative to the radar sensor 115 based on data received from the radar sensor 115.

The radar sensor 115 can include a plurality of emitters and receivers. Each emitter emits a continuous wave signal at a frequency that varies over a fixed period of time (e.g., a sine wave, a sawtooth wave, a triangle wave, a square wave, etc.), and each receiver can receive a reflected wave signal reflected off a detection point 205 of the object 200. As used herein, a "detection point" is a point on a surface of the object 200 from which the radar sensor 115 collects data. The vehicle computer 110 can then determine the frequency of each received signal, e.g., by using signal processing techniques. The frequency of a received wave signal is a data point detected by the radar sensor 115 by the wave reflected from a detection point 205 of the object 200. That is, each radar sensor 115 receives a plurality of data points, i.e., at least one data point is received at each of the plurality of receivers.

Figure 3:
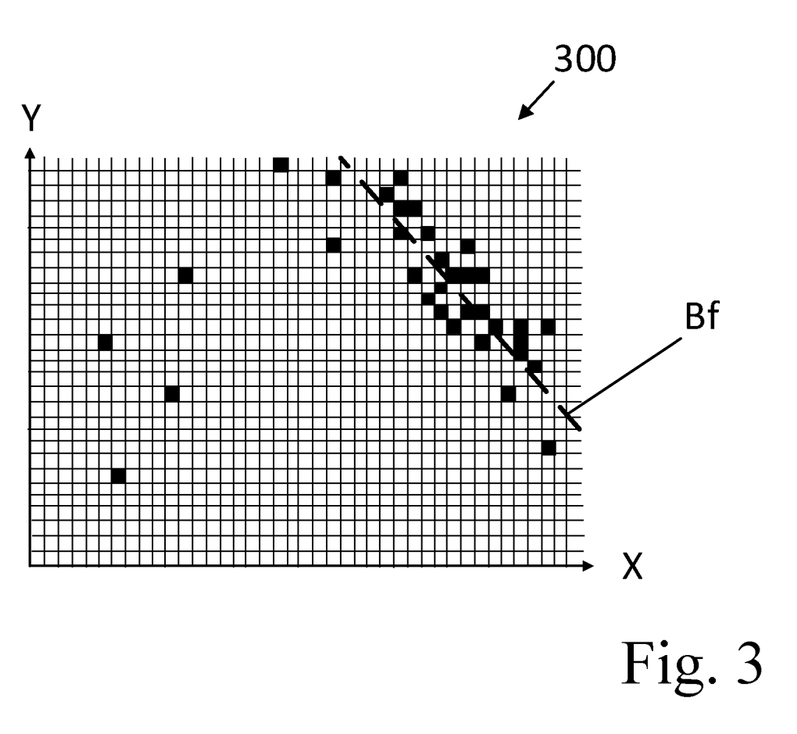
FIG. 3 is a diagram of an example occupancy grid including the best fit line corresponding to the object.

Turning now to FIG. 3, upon detecting the object 200, the vehicle computer 110 may be programmed to generate an occupancy grid map 300 based on the radar sensor 115 data, i.e., the plurality of received data points. An occupancy grid map 300 is a two-dimensional array of grid cells that model occupancy (i.e., data showing objects and/or environmental features) of respective locations of the environment around the vehicle 105, and specifically, the radar sensor 115. As discussed above, a radar sensor 115 typically provides data in a two-dimensional plane, e.g., an x-y plane. Each cell corresponds to a location that is specified with respect to a sensor 115 coordinate system, e.g., a Cartesian coordinate system having an origin at the radar sensor 115. Each cell may be identified with a grid index x,y with respect to the origin, i.e., the radar sensor 115. Each cell includes information regarding the presence or absence of an object 200 in the respective cell of the occupancy grid map 300. An occupancy of a cell, i.e., whether an object 200 or part of an object 200 is detected in the cell, may be specified by a binary value, e.g., 0 (no object detected or unoccupied) shown with white color, 1 (object present or occupied) shown with dark color.

An example occupancy grid map 300 is shown in FIG. 3. Upon generating the occupancy grid map 300, the vehicle computer 110 can determine the best fit line Bf (see FIG. 3) based on a set of detection points that partly define a feature, e.g., side, edge, etc., of the object 200. The best fit line is a line through the set of detection points that best represents a feature of the object 200 corresponding to the set of detection points. That is, the best fit line approximates an orientation of the feature, e.g., side, edge, etc., of the object 200 relative to the radar sensor 115. The vehicle computer 110 may be programmed to detect the object 200 in the grid map 300 using image processing techniques. For example, the vehicle computer 110 may detect the object 200 based on identifying an area with occupied cells. The vehicle computer 110 can then determine the best fit line Bf for the object 200 using known calculation methods, e.g., linear least squares, linear regression, random sample consensus (RANSAC), etc.

Figure 4:
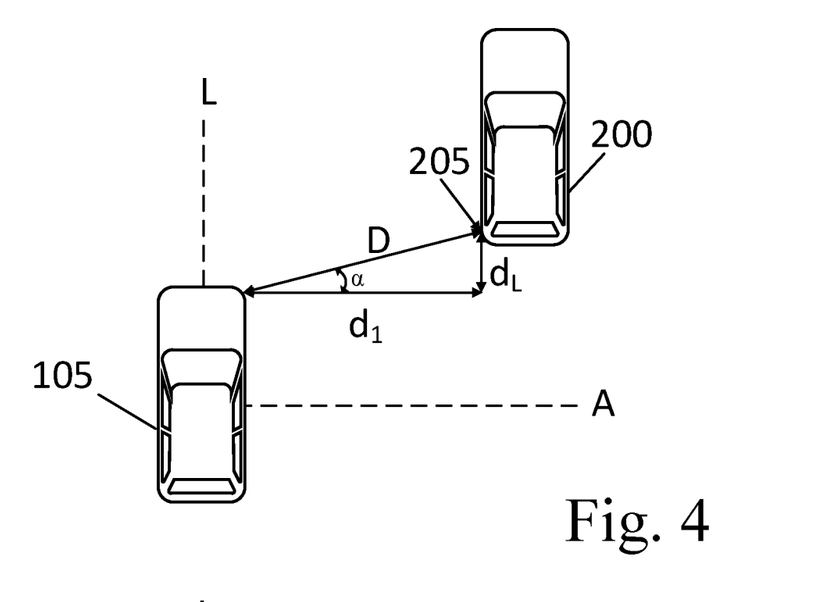
FIG. 4 is a diagram illustrating determining a first distance between the vehicle at a first location and the object.

Additionally, referring now to FIG. 4, the vehicle computer 110 can determine the first distance $d_1$ between the vehicle 105 at the first location and the object 200. The first distance $d_1$ is determined along a line extending parallel to a lateral axis A of the vehicle 105 at the first location. That is, the first distance $d_1$ is a lateral distance between the vehicle 105 at the first location and the object 200.

For example, to determine the first distance $d_1$, the vehicle computer 110 can determine a straight-line, i.e., shortest, distance D to the detected object 200 based on the radar sensor 115 data. As set forth above, the radar sensor 115 can emit a wave signal and receive a reflected wave signal reflected off of a detection point 205 of an object 200. The vehicle computer 110 can measure a time elapsed from emitting the wave signal to receiving the reflected wave signal. Based on the time elapsed and the speed of light, i.e., a direct time-of-flight technique, the vehicle computer 110 can determine the straight line distance D between the radar sensor 115 and the detection point of the object 200. Based on the radar sensor 115 data, i.e., the received reflected wave signal, the vehicle computer 110 can further determine an angle α between a line from the sensor 115 to the detection point 205 of the object 200 defined by the straight line distance D and an axis extending from the sensor 115 parallel to the lateral axis A of the vehicle 105 at the first location. If the angle α is greater than zero degrees (as shown in FIG. 4A), using trigonometric functions based on lines defined by D and $d_1$ intersecting a line $d_L$, which intersects the detection point 205 and with which the line defined by $d_1$ forms a right angle, the vehicle computer 110 can determine a length of the line defined by $d_1$, i.e., drawn parallel to the vehicle 105 lateral axis A at the first location. The first distance $d_1$ may be determined from the length of the line drawn parallel to the vehicle 105 lateral axis A. If the angle α is zero degrees (as shown in FIGS. 5 and 6A-6D), the vehicle computer 110 determines that the first distance $d_1$ is the straight-line distance D.

Figure 5:
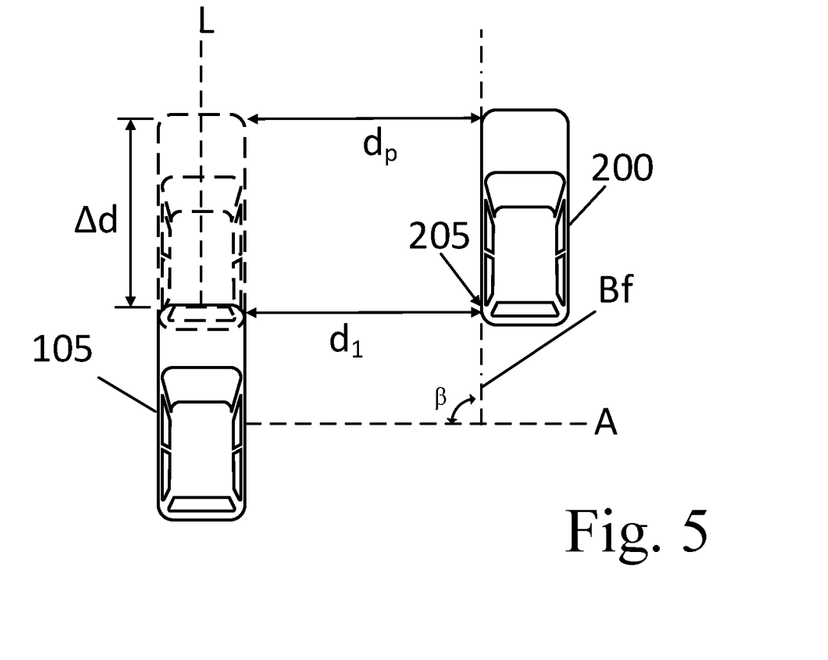
FIG. 5 is a diagram illustrating determining a predicted second distance between the vehicle at a second location and the object based on a best fit line corresponding to the object.

Turning to FIG. 5, the vehicle computer 110 may be programmed to specify the distance Δd to move to from the first location to a second location. In other words, the second location is spaced from the first location by the distance Δd. The second location is a location at which the vehicle computer 110 calibrates the center steering wheel angle. The distance Δd is a linear distance. The distance Δd may be determined empirically, e.g., based on a minimum linear distance of travel for the vehicle computer 110 to determine whether the vehicle 105 has diverged from the planned path. The vehicle computer 110 may store the distance Δd, e.g., in a memory. The vehicle computer 110 may select the distance Δd from a plurality of distances Δd, e.g., stored in a look-up table or the like, corresponding to one or more features of the vehicle 105, e.g., tire pressure, weight distribution such as seat occupancy, cargo placement, wheelbase, etc.

Turning to FIG. 5, while at the first location, i.e., the location at which calibration of the center steering wheel angle is initiated, the vehicle computer 110 may be programmed to determine a predicted second distance $d_p$ between the vehicle 105 at the second location (shown in broken lines in FIG. 5) and the object 200 based on the first distance $d_1$, the distance Δd, and the best fit line Bf. The predicted second distance $d_p$ is determined along a line extending parallel to the lateral axis A of the vehicle 105 at the first location. The predicted second distance dp is a predicted lateral distance between the vehicle 105 at the second location and the object 200. That is, the vehicle computer 110 predicts the lateral distance between the vehicle 105 at the second location and the object 200 assuming the vehicle 105 moves along a straight line from the first location to the second location.

For example, to determine the predicted second distance $d_p$, the vehicle computer 110 can determine an angle β between the lateral axis A of the vehicle 105 at the first location and the best fit line Bf. That is, the angle β defines an orientation of the object 200 relative to the vehicle 105. In the case that best fit line Bf is orthogonal to the lateral axis A, i.e., the angle β is 90 degrees, the vehicle computer 110 can determine the predicted second distance $d_p$ is equal to the first distance $d_1$, as shown in FIG. 5.

Figure 6A:
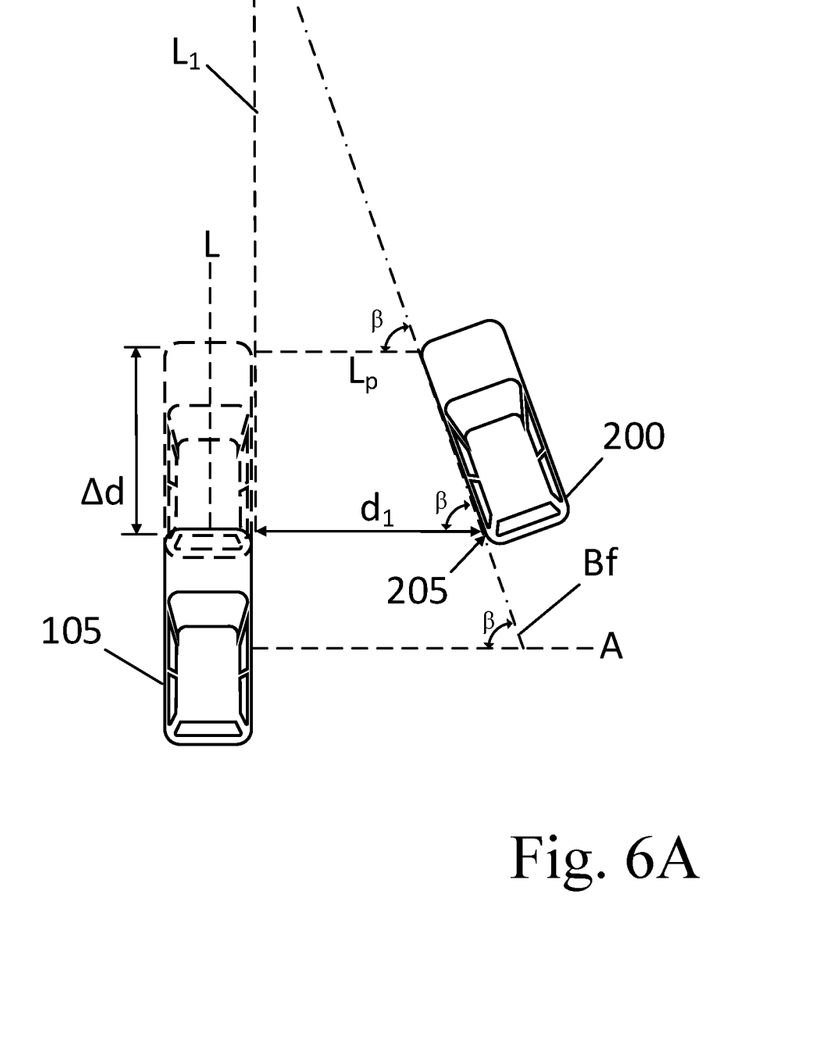
FIGS. 6A-6D are diagrams illustrating example measured second distances between the vehicle at the second location and the object.

Turning to FIG. 6A where the vehicle 105 is shown at the first location in solid lines and at the second location in broken lines, in the case that the best fit line Bf is oblique, i.e., not parallel and not orthogonal, to the lateral axis A, the vehicle computer 110 determines that the predicted second distance $d_p$ is different than the first distance $d_1$. For example, when the angle β is greater than 90 degrees, the vehicle computer 110 can determine the predicted second distance $d_p$ is greater than the first distance $d_1$, and when the angle β is less than 90 degrees, the vehicle computer 110 can determine the predicted second distance $d_p$ is less than the first distance $d_1$.

In these circumstances, the vehicle computer 110 can determine the predicted second distance $d_p$ using trigonometric functions, e.g., similar triangles. For example, the best fit line Bf, a line $L_1$ extending from the sensor 115 parallel to the longitudinal axis L of the vehicle 105 at the first location, and a second line defined by the first distance $d_1$ and intersecting the first line $L_1$ at a right angle, and which extends from the detection point 205 of the object 200 parallel to the lateral axis A of the vehicle 105 at the first location, may be arranged to form one right triangle. For example, the vehicle computer 110 may extrapolate the best fit line Bf, e.g., using known extrapolation methods such as linear extrapolation, to intersect the line L1 and the line defined by the first distance $d_1$.

Further, the best fit line Bf, the first line $L_1$, and a predicted line $L_p$, which extends from the sensor 115 at the second location to the best fit line Bf and parallel to the lateral axis A of the vehicle 105 at the first location, may be arranged to form another right triangle. The predicted line $L_p$ is spaced from the line defined by the first distance $d_1$ by the distance $\Delta d$. Then, using similar triangles techniques, the vehicle computer 110 can determine the length of the predicted line $L_p$ based on the two right triangles and the first distance $d_1$. The predicted second distance $d_p$ may be determined from the length of the predicted line. The vehicle computer 110 can store the predicted second distance $d_p$, e.g., in a memory.

Figure 6B:
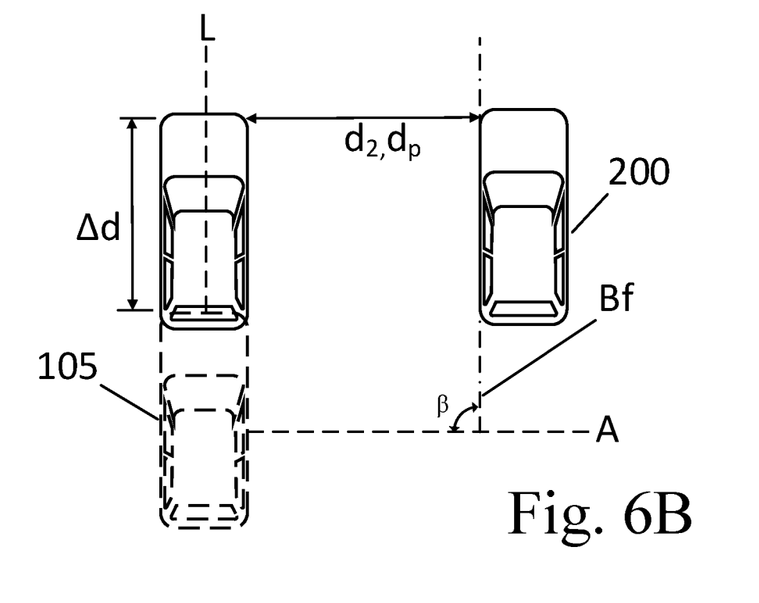

Turning to FIG. 6B, upon determining the predicted second distance $d_p$, the vehicle computer 110 is programmed to operate the vehicle 105 from the first location (show in broken lines) to the second location (shown in solid lines) based on the center steering wheel angle, i.e., the vehicle computer 110 operates the vehicle 105 with the steering wheel in a neutral position. For example, the vehicle computer 110 can actuate one or more host vehicle components 125, e.g., a propulsion component, a steering component, etc., to move the vehicle 105 the distance $\Delta d$ from the first location. The vehicle computer 110 may determine whether the steering wheel angle is equal to the center steering wheel angle, e.g., based on data received from a steering wheel sensor. In the case that the steering wheel angle differs from the center steering wheel angle, the vehicle computer 110 can control the steering wheel angle to move to the center steering wheel angle, e.g., apply a torque via an actuator to rotate the steering wheel to the neutral position, prior to moving the vehicle 105. When the steering wheel is at the center steering wheel angle, the vehicle computer 110 can operate the vehicle 105 to move the distance $\Delta d$ from the first location. The vehicle computer 110 maintains the steering wheel at the center steering wheel angle while the vehicle 105 moves the distance $\Delta d$ from the first location to the second location.

The vehicle computer 110 can determine that the vehicle 105 is at the second location based on sensor data. For example, the vehicle computer 110 can determine a travel distance between the first location and the vehicle 105, e.g., based on a navigation system, a GPS sensor, etc. When the travel distance equals the distance $\Delta d$, the vehicle computer 110 determines that the vehicle 105 is at the second location. In this situation, the vehicle computer 110 may stop the vehicle 105. Additionally, the vehicle computer 110 may, for example, be programmed to determine a heading of the vehicle 105 at the second location based on a coordinate system of the GPS. The heading of the vehicle 105 is defined with respect to a coordinate system, e.g., by an angle between the longitudinal axis L' of the vehicle 105 at the second location and the latitudinal or X axis of the GPS coordinate system.

The vehicle computer 110 is programmed to determine the measured second distance $d_2$ between the vehicle 105 at the second location and the object 200. The measured second distance $d_2$ is determined along a line extending parallel to a lateral axis A of the vehicle 105 at the first location. The measured second distance $d_2$ is a lateral distance between the vehicle 105 at the second location and the object 200. The vehicle computer 110 can determine the measured second distance $d_2$ based on second sensor data. Second sensor data is sensor data received by the vehicle computer 110 when the vehicle 105 is at the second location. The second sensor data may be from the same sensor 115 as the sensor 115 data. For example, the second sensor data may be radar sensor 115 data, as discussed above. The vehicle computer 110 can determine the measured second distance $d_2$ in a same manner as the first distance $d_1$, as discussed above.

The vehicle computer 110 can then compare the predicted second distance $d_p$ to the measured second distance $d_2$. In the case that the predicted second distance $d_p$ is equal to the measured second distance $d_2$ (see FIG. 6B), the vehicle computer 110 determines that the center steering wheel angle is calibrated to maintain the vehicle 105 along a straight path. That is, the vehicle computer 110 determines that the vehicle 105 will move straight when operated based on the center steering wheel angle. In this situation, the vehicle computer 110 is programmed to maintain the center steering wheel angle, e.g., at the neutral position.

Figure 6C:
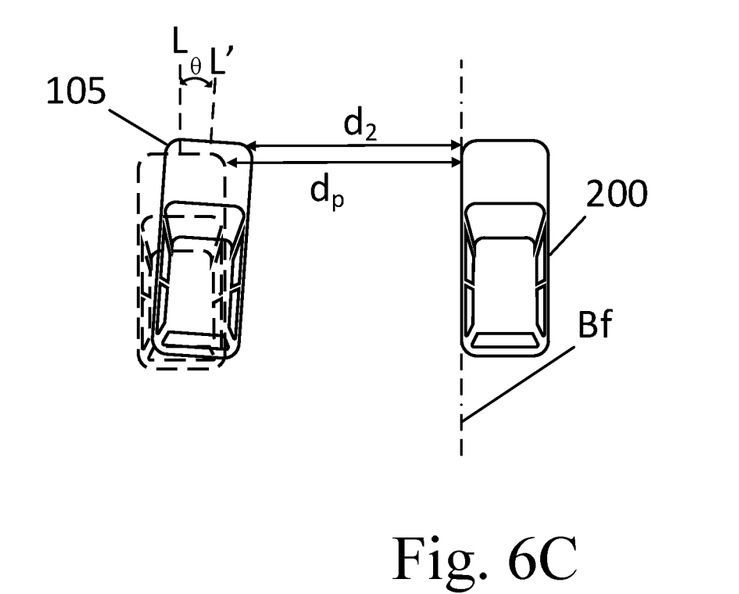
Figure 6D:
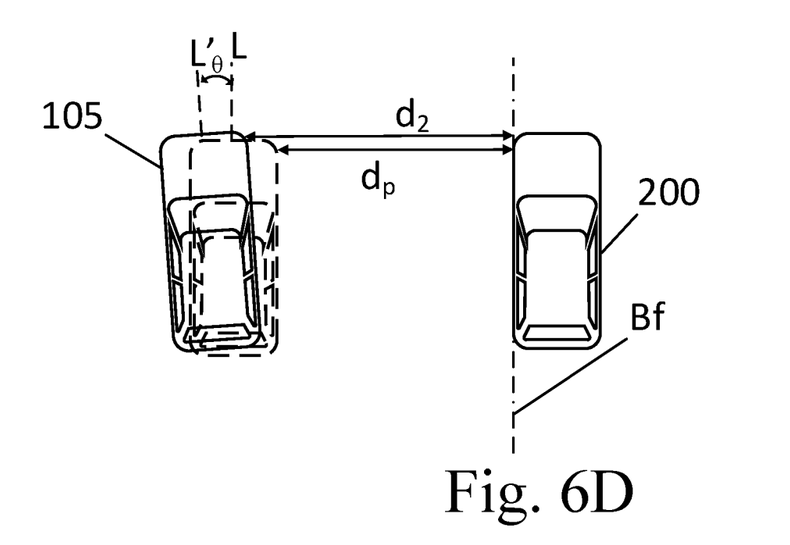

Turning now to FIGS. 6C and 6D, in the case that the predicted second distance $d_p$ is different than, i.e., does not equal, the measured second distance $d_2$, the vehicle computer 110 determines that the center steering wheel angle is not calibrated to maintain the vehicle 105 along a straight path. That is, the vehicle computer 110 determines that the vehicle 105 will turn when operated based on the center steering wheel angle. In this situation, the vehicle computer 110 updates the center steering wheel angle, e.g., to an angle away from the neutral position. The vehicle computer 110 determines a direction to update the center steering wheel angle. When the predicted second distance $d_p$ is less than the measured second distance $d_2$ (see FIG. 6D), the vehicle computer 110 updates the center steering wheel angle in a first direction towards the object 200, e.g., clockwise when the object 200 is on a right side of the vehicle 105 or counterclockwise when the object 200 is on a left side of the vehicle 105. When the predicted second distance $d_p$ is greater than the measured second distance $d_2$ (see FIG. 6C), the vehicle computer 110 updates the center steering wheel angle in a second direction away from the object 200, e.g., clockwise when the object 200 is on the left side of the vehicle 105 or counterclockwise when the object 200 is on the right side of the vehicle 105.

Additionally, the vehicle computer 110 determines an angle to update the center steering wheel angle. For example, the vehicle computer 110 can compare the heading of the vehicle 105 at the first location to the heading of the vehicle 105 at the second location. In such an example, the vehicle computer 110 can determine an angle $\theta$ between the heading, i.e., the longitudinal axis L, of the vehicle 105 at the first location and the heading, i.e., the longitudinal axis L', of the vehicle 105 at the second location, as shown in FIGS. 6C and 6D. The vehicle computer 110 can then determine the updated center steering wheel angle to operate the vehicle 105 along a straight path based on the angle $\theta$ and the steering ratio. For example, the vehicle computer 110 can determine the updated center steering wheel angle by dividing the angle $\theta$ by the steering ratio. As another example, the vehicle computer 110 can determine the angle to update the center steering wheel angle based on the distance $\Delta d$ and the measured second distance $d_2$. For example, the vehicle computer 110 can determine a line extending from the sensor 115 at the second location to the sensor 115 at the first location, using trigonometric functions, based on a line defined by a difference between lines defined by the predicted second distance dp and the measured second distance $d_2$, and a line defined by the distance $\Delta d$ (i.e., extending along the longitudinal axis L of the vehicle 105 at the first location) that intersects the line defined by the difference. The vehicle computer 110 can then determine the angle $\theta$ between the line extending from the sensor 115 at the second location to the sensor 115 at the first location and the line defined by the distance $\Delta d$.

The vehicle computer 110 is programmed to then operate the vehicle 105 based on the calibrated center steering wheel angle. That is, the vehicle computer 110 can actuate the steering component based on one of the maintained center steering wheel angle or the updated center steering wheel angle to direct the vehicle 105 along the planned path P. The calibrated center steering wheel angle may correspond to the neutral position of the steering wheel or may correspond to a position of the steering wheel rotated away from the neutral position of the steering wheel (e.g., in the first or the second direction).

Figure 7:
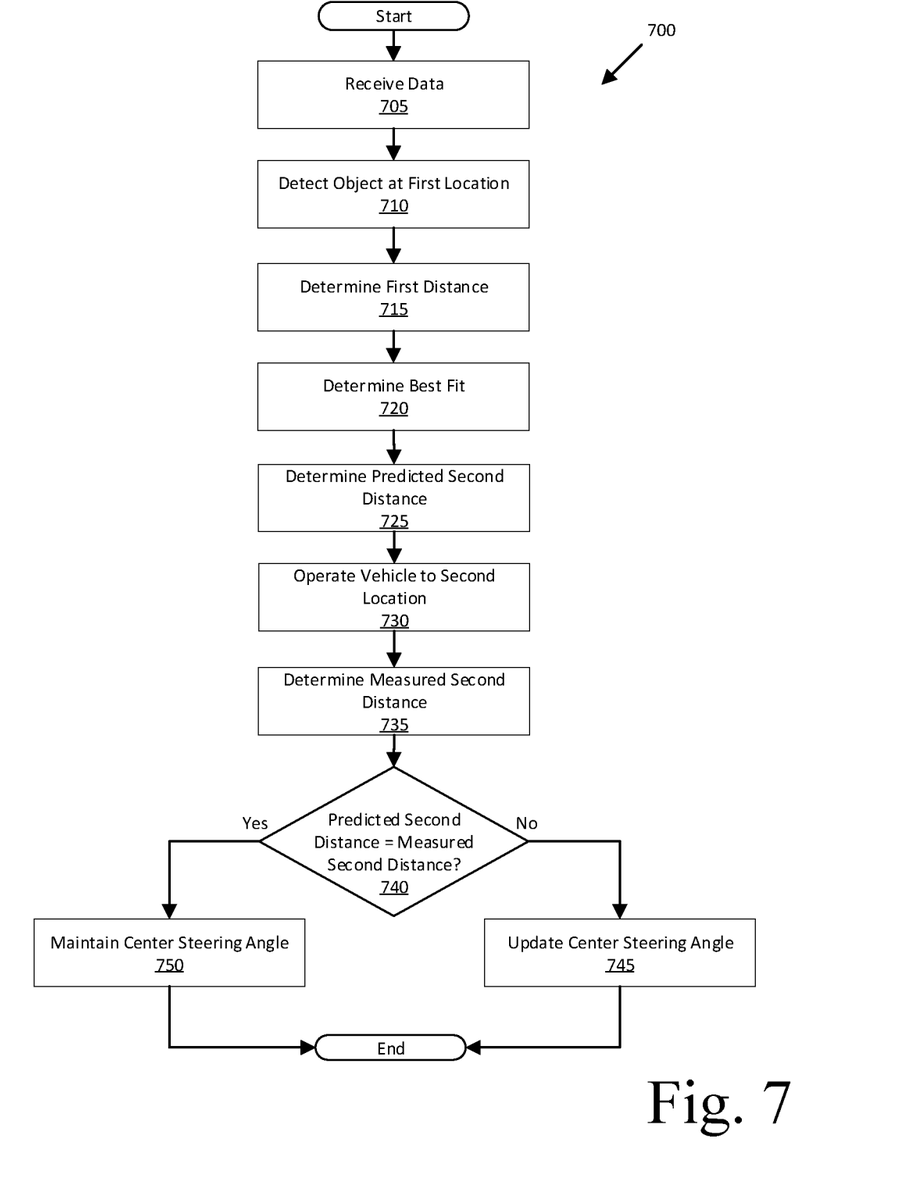
FIG. 7 is a flowchart of an example process for calibrating a center steering wheel angle of the vehicle.

FIG. 7 is a diagram of an example process 700 for calibrating a center steering wheel angle of a vehicle 105. The process 700 begins in a block 705. The process 700 can be carried out by a vehicle computer 110 executing program instructions stored in a memory thereof.

In the block 705, the vehicle computer 110 receives data from one or more sensors 115, e.g., via the vehicle network, and/or from a remote server computer 140, e.g., via the network 135. For example, the vehicle computer 110 can receive location data of the vehicle 105, e.g., from a sensor 115, a navigation system, etc. Additionally, the vehicle computer 110 can receive radar data, e.g., from one or more radar sensors 115. The radar data may include data about the environment around the vehicle 105, e.g., buildings, signs, other vehicles, etc. The process 700 continues in a block 710.

In the block 710, the vehicle computer 110 detects an object 200 on one side of the vehicle 105 based on the sensor 115 data. For example, the vehicle computer 110 can detect the object 200 in radar data, as discussed above. That is, the sensor 115, e.g., a radar sensor 115, can receive a wave signal reflected from a detection point 205 of the object 200, and the vehicle computer 110 can then determine the frequency of each received signal, e.g., by using signal processing techniques. As set forth above, radar sensors 115 may provide two-dimensional data, e.g., data in a horizontal plane. For example, the vehicle computer 110 may determine location coordinates (x, y) of the object 200 relative to the radar sensor 115 based on data received from the radar sensor 115.

Additionally, the vehicle computer 110 can determine a first location of the vehicle 105 upon detecting the object 200. For example, the vehicle computer 110 may determine the first location, e.g., according to geo-coordinates such as GPS (Global Positioning System) location coordinates, of the vehicle 105, e.g., based on data received from GPS sensor 115. Further, the vehicle computer 110 may be programmed to determine a heading of the vehicle 105 at the first location based on a global coordinate system e.g., a coordinate system of the GPS, as discussed above. The process 700 continues in a block 715.

In the block 715, the vehicle computer 110 determines a first distance $d_1$ between the vehicle 105 at the first location and the object 200. As set forth above, the first distance $d_1$ is a lateral distance between the vehicle 105 at the first location and the object 200. For example, the vehicle computer 110 can determine the first distance $d_1$ between the vehicle 105 at the first location and the object 200 based on radar sensor 115 data, e.g., using a direct time-of-flight technique and/or trigonometric functions, as discussed above. The process 700 continues in a block 720.

In the block 720, the vehicle computer 110 determines a best fit line Bf based on a set of detection points that partly define a feature, e.g., side, edge, etc., of the object 200. For example, based on the radar sensor 115 data, the vehicle computer 110 can generate an occupancy grid map, as discussed above. The vehicle computer 110 may be programmed to detect the object 200 in the occupancy grid map 300 using image processing techniques, as discussed above. Upon identifying the object 200 in the occupancy grid map 300, the vehicle computer can then determine the best fit line Bf for the object 200, i.e., the set of detection points, using any suitable technique, e.g., linear least squares, linear regression, random sample consensus (RANSAC), etc. The process 700 continues in a block 725.

In the block 725, while the vehicle 105 is at the first location, the vehicle computer 110 determines a predicted second distance $d_p$ between the vehicle 105 at a second location and the object 200. As set forth above, the predicted second distance dp is a predicted lateral distance between the vehicle 105 at the second location and the object 200. For example, the vehicle computer 110 may be programmed to specify a distance Δd, e.g., a linear distance, to move from the first location to the second location. The vehicle computer 110 can then determine the predicted second distance $d_p$ based on the first distance $d_1$, the distance Δd, and the best fit line Bf, e.g., using trigonometric functions, such as similar triangles, as discussed above. The process 700 continues in a block 730.

In the block 730, the vehicle computer 110 operates the vehicle 105 from the first location to the second location based on the center steering wheel angle. That is, the vehicle computer 110 operates the vehicle 105 with a steering wheel in a neutral position from the first location to the second location. For example, the vehicle computer 110 can actuate one or more host vehicle components 125, e.g., a propulsion component, a steering component, etc., to move the vehicle 105 the distance Δd from the first location. The vehicle computer 110 determines that the vehicle 105 is at the second location based on sensor data, as discussed above. Additionally, the vehicle computer 110 may be programmed to determine a heading of the vehicle 105 at the second location based on a coordinate system of the GPS, as discussed above. The process 700 continues in a block 735.

In the block 735, the vehicle computer 110 determines a measured second distance $d_2$ between the vehicle 105 at the second location and the object 200. As set forth above, the measured second distance $d_2$ is a lateral distance between the vehicle 105 at the second location and the object 200. The vehicle computer 110 can determine the measured second distance $d_2$ based on second sensor 115 data, i.e., sensor 115 data received by the vehicle computer 110 when the vehicle 105 is at the second location. The vehicle computer 110 can determine the measured second distance $d_2$ in a same manner as the first distance $d_1$, as discussed above. The process 700 continues in a block 740.

In the block 740, the vehicle computer 110 determines whether the predicted second distance $d_p$ equals the measured second distance $d_2$. For example, the vehicle computer 110 can compare the predicted second distance $d_p$ to the measured second distance $d_2$. In the case that the predicted second distance $d_p$ does not equal the measured second distance $d_2$, the process 700 continues in a block 745. In the case that the predicted second distance $d_p$ equals the measured second distance $d_2$, the process 700 continues in a block 750.

In the block 745, the vehicle computer 110 determines that the center steering wheel angle is not calibrated to maintain the vehicle 105 along a straight path. That is, the vehicle computer 110 determines that the vehicle 105 will turn from a planned path P when operated based on the center steering wheel angle. The vehicle computer 110 is programmed to update the center steering wheel angle. In the case that the predicted second distance $d_p$ is less than the measured second distance $d_2$, the vehicle computer 110 determines that the vehicle 105 will turn away from the object 200 when operated based on the center steering wheel angle. In this situation, the vehicle computer 110 updates the center steering wheel angle in a first direction. As set forth above, the first direction is a direction towards the object 200. In the case that the predicted second distance $d_p$ is greater than the measured second distance $d_2$, the vehicle computer 110 determines that the vehicle 105 will turn towards the object 200 when operated based on the center steering wheel angle. In this situation, the vehicle computer 110 updates the center steering wheel angle in a second direction. As stated above, the second direction is a direction away from the object 200.

Additionally, the vehicle computer 110 determines an angle to update the center steering wheel angle. For example, the vehicle computer 110 can compare the heading of the vehicle 105 at the first location to the heading of the vehicle 105 at the second location. In such an example, the vehicle computer 110 can determine an angle θ between the headings, as discussed above. The vehicle computer 110 can then determine the updated center steering wheel angle to operate the vehicle 105 along a straight path based on the angle θ and the steering ratio. The vehicle computer 110 then operates the vehicle 105 based on the updated center steering wheel angle. The process 700 ends following block 745.

In the block 750, the vehicle computer determines that the center steering wheel angle is calibrated to maintain the vehicle 105 along a straight path. That is, the vehicle computer 110 determines that the vehicle 105 will move straight when operated based on the center steering wheel angle. In this situation, the vehicle computer 110 is programmed to maintain the center steering wheel angle, e.g., at the neutral position. The process 700 ends following the block 750.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first," "second," "third," and "fourth," are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   determine a first distance $d_1$ between a vehicle at a first location and an object;
   determine a best fit line $b_f$ representing the object from a plurality of sensor data, and specify to move the vehicle a distance $\Delta d$ to a second location;
   determine a predicted second distance $d_p$ between the vehicle at the second location and the object based on the first distance $d_1$, the distance $\Delta d$, and the best fit line $b_f$;
   operate the vehicle from the first location to the second location based on a center steering wheel angle;
   determine a measured second distance $d_2$ between the vehicle at the second location and the object;
   then actuate vehicle steering based on (a) maintaining the center steering wheel angle based on the predicted second distance $d_p$ matching the measured second distance $d_2$, or (b) updating the center steering wheel angle based on the predicted second distance $d_p$ being different than the measured second distance $d_2$.

2. The system of claim 1, wherein the instructions further include instructions to determine each of the first distance $d_1$, the measured second distance $d_2$, and the predicted second distance $d_p$ along a line extending parallel to a lateral axis of the vehicle at the first location.

3. The system of claim 1, wherein the instructions further include instructions to determine the predicted second distance $d_p$ additionally based on an angle between the best fit line $b_f$ and one of a longitudinal axis of the vehicle or a lateral axis of the vehicle at the first location.

4. The system of claim 3, wherein the instructions further include instructions to determine each of the measured second distance $d_2$ and the predicted second distance $d_p$ along a line extending parallel to the lateral axis of the vehicle at the first location.

5. The system of claim 1, wherein the instructions further include instructions to update the center steering wheel angle in one of (a) a first direction towards the object based on the predicted second distance $d_p$ being less than the measured second distance $d_2$, or (b) a second direction away from the object based on the predicted second distance $d_p$ being greater than the measured second distance $d_2$.

6. The system of claim 1, wherein the instructions further include instructions to:
   upon determining the predicted second distance $d_p$ is different than the measured second distance $d_2$, determine an angle between a heading of the vehicle at the second location and a heading of the vehicle at the first location; and
   update the center steering wheel angle additionally based on the angle.

7. The system of claim 1, wherein the instructions further include instructions to extrapolate the best fit line $b_f$ to intersect at least one of a longitudinal axis of the vehicle at the first location or a lateral axis of the vehicle at the first location.

8. The system of claim 1, wherein the instructions further include instructions to determine the measured second distance $d_2$ based on second sensor data.

9. The system of claim 1, wherein the instructions further include instructions to, upon generating an occupancy grid map based on the plurality of sensor data, determine the best fit line $b_f$ based on the occupancy grid map.

10. The system of claim 1, wherein the object is stationary and on one side of the vehicle.

11. A computer-implemented method, comprising:
    determining a first distance $d_1$ between a vehicle at a first location and an object;
    determining a best fit line $b_f$ representing the object from a plurality of sensor data, and specify to move the vehicle a distance $\Delta d$ to a second location;
    determining a predicted second distance $d_p$ between the vehicle at the second location and the object based on the first distance $d_1$, the distance $\Delta d$, and the best fit line $b_f$;
    operating the vehicle from the first location to the second location based on a center steering wheel angle;
    determining a measured second distance $d_2$ between the vehicle at the second location and the object;
    then actuating vehicle steering based on (a) maintaining the center steering wheel angle based on the predicted second distance $d_p$ matching the measured second distance $d_2$, or (b) updating the center steering wheel angle based on the predicted second distance $d_p$ being different than the measured second distance $d_2$.

12. The method of claim 11, further comprising determining each of the first distance $d_1$, the measured second distance $d_2$, and the predicted second distance $d_p$ along a line extending parallel to a lateral axis of the vehicle at the first location.

13. The method of claim 11, further comprising determining the predicted second distance $d_p$ additionally based on an angle between the best fit line $b_f$ and one of a longitudinal axis of the vehicle or a lateral axis of the vehicle.

14. The method of claim 13, further comprising determining each of the measured second distance $d_2$ and the predicted second distance $d_p$ along a line extending parallel to the lateral axis of the vehicle at the first location.

15. The method of claim 11, further comprising updating the center steering wheel angle in one of (a) a first direction towards the object based on the predicted second distance $d_p$ being less than the measured second distance $d_2$, or (b) a second direction away from the object based on the predicted second distance $d_p$ being greater than the measured second distance $d_2$.

16. The method of claim 11, further comprising:
   upon determining the predicted second distance $d_p$ is different than the measured second distance $d_2$, determining an angle between a heading of the vehicle at the second location and a heading of the vehicle at the first location; and
   updating the center steering wheel angle additionally based on the angle.

17. The method of claim 11, further comprising determining the measured second distance $d_2$ based on second sensor data.

18. The method of claim 11, further comprising, upon generating an occupancy grid map based on the plurality of sensor data, determining the best fit line $b_f$ based on the occupancy grid map.

* * * * *